United States Patent
Pham et al.

(10) Patent No.: US 8,849,039 B2
(45) Date of Patent: Sep. 30, 2014

(54) IMAGE PROCESSING METHOD AND SYSTEM

(75) Inventors: Minh-Tri Pham, Cambridge (GB); Oliver Woodford, Cambridge (GB); Frank Perbet, Cambridge (GB); Atsuto Maki, Cambridge (GB); Bjorn Stenger, Cambridge (GB); Roberto Cipolla, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

(21) Appl. No.: 13/407,357

(22) Filed: Feb. 28, 2012

(65) Prior Publication Data
US 2013/0016913 A1    Jan. 17, 2013

(30) Foreign Application Priority Data

Jul. 11, 2011    (GB) .................................. 1111871.8

(51) Int. Cl.
| | | |
|---|---|---|
| G06K 9/48 | (2006.01) | |
| G06T 7/00 | (2006.01) | |
| G06K 9/00 | (2006.01) | |
| G06K 9/20 | (2006.01) | |

(52) U.S. Cl.
CPC ..... *G06T 7/0042* (2013.01); *G06T 2207/10024* (2013.01); *G06T 2207/30208* (2013.01); *G06T 7/0073* (2013.01); *G06K 9/00214* (2013.01); *G06T 2207/30244* (2013.01); *G06K 9/2036* (2013.01)
USPC ......................................................... 382/197

(58) Field of Classification Search
None
See application file for complete search history.

(56) References Cited

U.S. PATENT DOCUMENTS

| | | | | |
|---|---|---|---|---|
| 7,313,266 | B2* | 12/2007 | Ishiyama | ...................... 382/154 |
| 7,526,123 | B2* | 4/2009 | Moon et al. | ................... 382/159 |
| 7,986,813 | B2* | 7/2011 | Hamanaka | ..................... 382/106 |

FOREIGN PATENT DOCUMENTS

| | | |
|---|---|---|
| EP | 1 727 087 A1 | 11/2006 |
| JP | 2001-250122 A | 9/2001 |
| JP | 2007-249592 A | 9/2007 |
| JP | 2009-182400 A | 8/2009 |

OTHER PUBLICATIONS

Office Action issued Jun. 18, 2013, in Japanese Patent Application No. 2012-155445 with English translation.

Ootani Jun, 3D Object Recognition and Attitude Estimation from a Depth Map, IEICE Technical Report, Japan, The Institute of Electronics, Information and Communication Engineers (IEICE), Feb. 23, 1990, the $89^{th}$ vol. 436, pp. 49-59 (with English Abstract).

United Kingdom Search Report issued Nov. 7, 2011, in Patent Application No. GB1111871.8.

Raghav Subbarao, et al., "Nonlinear Mean Shift over Riemannian Manifolds", Int. J. Comput. Vis., vol. 84, No. 1, (2009), pp. 1-20.

D. H. Ballard, "Generalizing the Hough Transform to Detect Arbitrary Shapes", Pattern Recognition, vol. 13, No. 2, (1981), pp. 111-122.

* cited by examiner

*Primary Examiner* — Vikkram Bali
(74) *Attorney, Agent, or Firm* — Oblon, Spivak, McClelland, Maier & Neustadt, L.L.P.

(57) ABSTRACT

A method of comparing two object poses, wherein each object pose is expressed in terms of position, orientation and scale with respect to a common coordinate system, the method comprising:

calculating a distance between the two object poses, the distance being calculated using the distance function:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

where X is the object pose of one object and Y is the object pose of the other object, $$d_s(X, Y) = \left|\log\left(\frac{s(X)}{s(Y)}\right)\right|,$$

$$d_r(X, Y) = \|R(X) - R(Y)\|_F,$$

-continued $$d_t(X, Y) = \frac{\|t(X) - t(Y)\|}{s(Y)},$$

s(X) and s(Y) are scalar functions representing the scale of the object poses X and Y respectively, R(X) and R(Y) are matrices expressing the rotation of object poses X and Y respectively, t(X) and t(Y) are vectors expressing the translation of object poses X and Y respectively, and $\sigma_s$, $\sigma_r$ and $\sigma_t$ are weighting factors for $d_s$, $d_r$ and $d_t$ respectively.

19 Claims, 10 Drawing Sheets
(9 of 10 Drawing Sheet(s) Filed in Color)

(a)

(b)

(c)

(a) (b) (c) (d) (e)

(a) (b) (c) (d) (e)

(f) (g) (h) (i) (j)

IMAGE PROCESSING METHOD AND SYSTEM

FIELD

Embodiments of the present invention as described herein are generally concerned with the field of image processing

BACKGROUND

During image processing there is often a need to estimate the pose of an object in an image. This need arises in many vision tasks including 2D object detection motion segmentation, camera pose estimation, 3D shape registration and recognition of 3D images. By pose estimation it is meant that the objects position, rotation or scale may need to be estimated.

BRIEF DESCRIPTION OF THE DRAWINGS

The patent or application file contains at least one drawing executed in color. Copies of this patent or patent application publication with color drawing(s) will be provided by the office upon request and payment of the necessary fee.

Embodiments of the present invention will now be described with reference following non-limiting embodiments in which:

FIGS. 14(a)-14(c) to be point clouds of industrial parts recognised in accordance with an embodiment of the present invention.

DETAILED DESCRIPTION OF THE DRAWINGS

Figure 1:
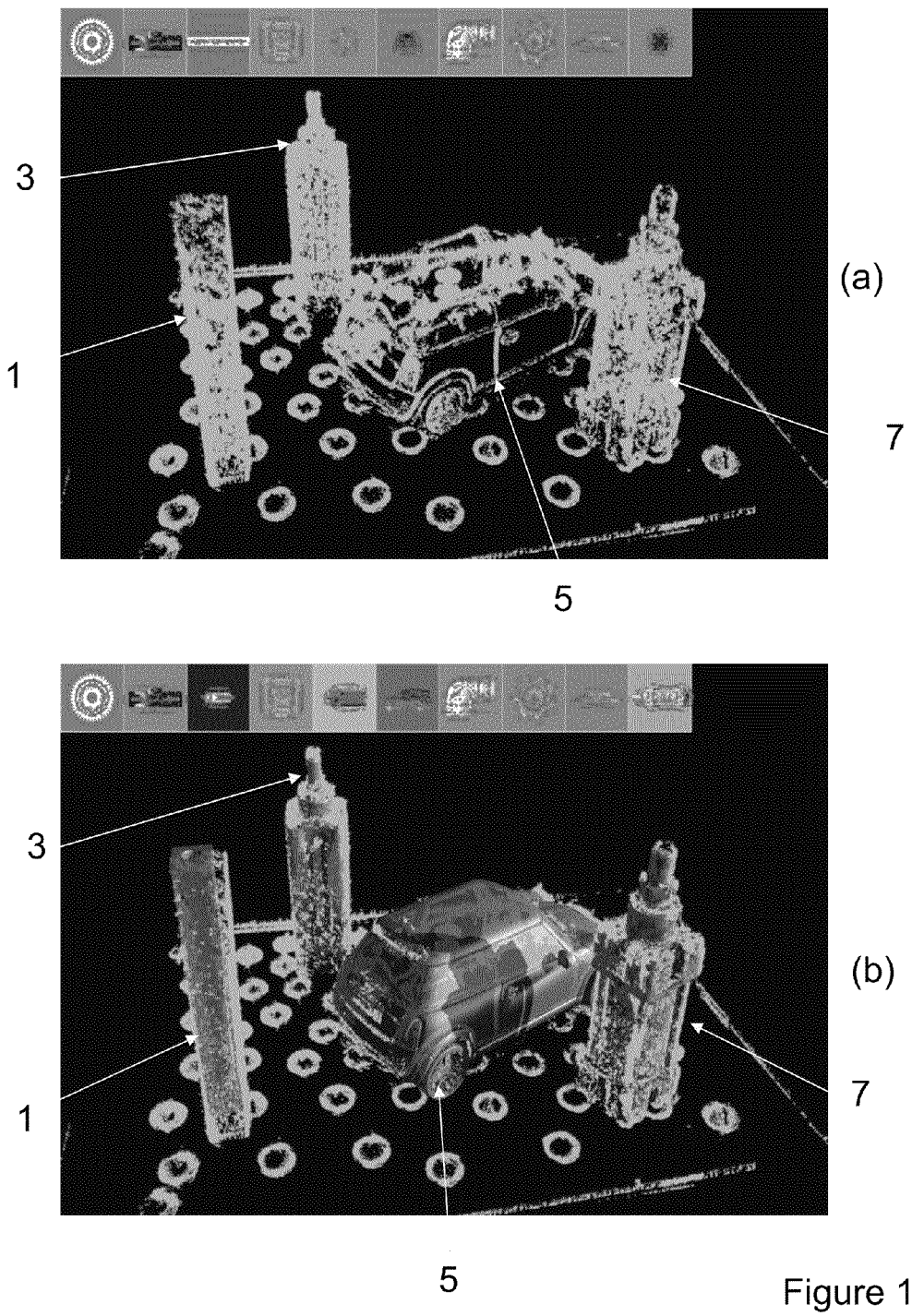
FIG. 1(a) is a point cloud generated from a captured 3-D image.
FIG. 1(b) demonstrates the objects recognised from the point cloud of FIG. 1(a)

According to one embodiment, a method of comparing two object poses is provided, wherein each object pose is expressed in terms of position, orientation and scale with respect to a common coordinate system, the method comprising:

calculating a distance between the two object poses, the distance being calculated using the distance function:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

where X is the object pose of one object and Y is the object pose of the other object, $$d_s(X, Y) = \left|\log\left(\frac{s(X)}{s(Y)}\right)\right|,$$

$$d_r(X, Y) = \|R(X) - R(Y)\|_F,$$

$$d_t(X, Y) = \frac{\|t(X) - t(Y)\|}{s(Y)},$$

s(X) and s(Y) are scalar functions representing the scale of the object poses X and Y respectively, R(X) and R(Y) are matrices expressing the rotation of object poses X and Y respectively, t(X) and t(Y) are vectors expressing the translation of object poses X and Y respectively, and $\sigma_s$, $\sigma_r$ and $\sigma_t$ are weighting factors for $d_s$, $d_r$ and $d_t$ respectively.

The above distance measure, which will be referred to as the sRt distance, can be used in a number of processes such as recognising and registering objects e.g. cars, pedestrians and lamp posts in vehicle information systems. It can be used when recognising industrial parts on production lines or the like. It can be used for the recognition in images of hands, faces, hearts, lungs, polyps etc. from cluttered scenes. It can be used for camera pose estimation, object tracking applications, tissue registration/polyp detection in medical imaging applications, car navigation applications, Human Computer applications (HCI), autofocus applications etc.

The above distance measure also lends itself to the development of a kernel using said distance, said kernel having the form:

$$K(d^2(X, Y)).$$

In one embodiment, the kernel is the Gaussian kernel with the form $$\exp\left(-\frac{\cdot}{2\sigma^2}\right)$$

where represents the variable of the Gaussian kernel, and σ is the bandwidth of the kernel. The Gaussian kernel using the sRt distance represents a probability density function on the space of poses which resembles the popular normal distribution on Euclidean spaces. It is very tractable analytically (i.e.

easy to work with) and its "bell" shape makes it a convenient choice for modelling random variables in practice.

The above weightings may be selected according to the application. In one embodiment, $0.04 \leq \sigma_s \leq 0.12$, $0.06 \leq \sigma_r \leq 0.20$ and $0.06 \leq \sigma_t \leq 0.20$.

A method of calculating an average may also be based on the above distance measure. Thus according to a further embodiment, a method of comparing an average of a plurality of object poses is provided, the method comprising using:

$$s(\mu_{sRt}(\chi)) = \exp\left(\frac{\sum_i w_i \log s(X_i)}{\sum_i w_i}\right),$$

$$R(\mu_{sRt}(\chi)) = sop\left(\frac{\sum_i w_i R(X_i)}{\sum_i w_i}\right),$$

$$t(\mu_{sRt}(\chi)) = \sum_i \frac{w_i t(X_i)}{s^2(X_i)} \bigg/ \sum_i \frac{w_i}{s^2(X_i)}$$

to calculate the mean object pose, where $X=\{(X_1,w_1),(X_2,w_2),\ldots(X_N,w_N)\}$ is a set of poses with $X_i$ is the ith pose, $w_i$ is a weight associated with the ith pose, $s(X_i)$ are a scalar functions representing the scale of the object poses $X_i$, $R(X_i)$ are matrices expressing the rotation of object poses $X_i$, $t(X_i)$ are vectors expressing the translation of object poses $X_i$, $sop(X)=\arg\min_{Y \in SO(n,R)} \|Y-X\|_F$ is the standard orthogonal projection of matrix $X$ onto $SO(n,R)$ where $SO(n,R)$ is the set of all n-by-n standard orthogonal real matrices and the function $sop(X)$ returns a standard orthogonal matrix $Y$ such that the Frobenius norm of $Y-X$ is minimized.

In a further embodiment, a method of analysing image data is provided, said method comprising:
analysing said image data to obtain a plurality of predictions of the pose of an object, said predictions comprising an indication of the predicted pose of the object, the predicted pose being expressed in terms of position, orientation and scale with respect to a common coordinate system,
grouping predictions together by comparing the predicted poses by calculating a distance between the two object poses, the distance being calculated using the distance function:

$$d_{sRt}(X,Y) = \sqrt{\frac{d_s^2(X,Y)}{\sigma_s^2} + \frac{d_r^2(X,Y)}{\sigma_r^2} + \frac{d_t^2(X,Y)}{\sigma_t^2}}.$$

where X and Y are object poses of the same object, $$d_s(X,Y) = \left|\log\left(\frac{s(X)}{s(Y)}\right)\right|,$$

$$d_r(X,Y) = \|R(X) - R(Y)\|_F,$$

$$d_t(X,Y) = \frac{\|t(X) - t(Y)\|}{s(Y)},$$

s(X) and s(Y) are scalar functions representing the scale of the object poses X and Y respectively, R(X) and R(Y) are matrices expressing the rotation of the object poses X and Y respectively, t(X) and t(Y) are vectors expressing the translation of the object poses X and Y respectively and $\sigma_s$, $\sigma_r$ and $\sigma_t$ are weighting factors for $d_s$, $d_r$ and $d_t$ respectively.

The image analysed in the above method may comprise at least one object and said prediction comprises an indication of said object and its pose. The indication of said object may be obtained by comparing at least a part of the data with data of objects in a database. In one embodiment, each object in said database comprises a plurality of features and comparing of image data with objects in the database comprises analysing said image data to look for matches with features of objects in said database.

In a further arrangement, the object whose pose is to be estimated is the camera used to capture the image.

In an embodiment, one a plurality of predictions for each pose have been generated, a density estimation method is used to estimate the density of the poses in order to be able to determined representative poses. In one embodiment, grouping the object poses comprises using a kernel density estimation method which assumes that all poses are sampled from a distribution f(X), said kernel of said kernel density estimation method comprising the said distance function.

The representative poses of the groups formed by said grouping may be calculated by determining the local maxima of f(X). The local maxima may be derived using many different techniques such as mean shift, quick shift or Medoid shift.

In the mean shift technique, in an embodiment, the mean at each stage of the iteration is calculated using:

$$s(\mu_{sRt}(\chi)) = \exp\left(\frac{\sum_i w_i \log s(X_i)}{\sum_i w_i}\right),$$

$$R(\mu_{sRt}(\chi)) = sop\left(\frac{\sum_i w_i R(X_i)}{\sum_i w_i}\right),$$

$$t(\mu_{sRt}(\chi)) = \sum_i \frac{w_i t(X_i)}{s^2(X_i)} \bigg/ \sum_i \frac{w_i}{s^2(X_i)}$$

where $X_i$ is the ith pose, $w_i$ is a weight associated with the ith pose to calculate the mean object pose, where $\chi=\{(X_1,w_1),(X_2,w_2),\ldots(X_N,w_N)\}$ is a set of poses with $X_i$ is the ith pose, $w_i$ is a weight associated with the ith pose, $sop(X)=\arg\min_{Y \in SO(n,R)} \|Y-X\|_F$ is the standard orthogonal projection of matrix $X$ onto $SO(n,R)$ where $SO(n,R)$ is the set of all n-by-n standard orthogonal real matrices and the function $sop(X)$ returns a standard orthogonal matrix $Y$ such that the Frobenius norm of $Y-X$ is minimized.

The weights, $w_i$ may be derived from $w_i = \lambda_i * K(d^2(Y, X_i))$, where K is a kernel function and d is a distance between the pose with the current estimated maxima Y using the mean shift technique and the pose $X_i$. In a further embodiment, the distance d is the sRt distance described above. However, it is possible to use other weights with the mean. In the mean shift method if $w_i = \lambda_i * K(d^2(Y, X_i))$ then when Y is stationary, Y is a local maximum of f(X). However, other methods do not require this constraint.

To reduce computing time, in some embodiments the pose estimations are first predicted using a Hough voting method or medoid shift method. In some embodiments, each prediction has an initial weighting.

The above methods may be applied to 2D and 3D image data. Further, the method may be expanded to higher dimensions.

In a further embodiment, an apparatus for comparing two object poses is provided, wherein each object pose is expressed in terms of position, orientation and scale with respect to a common coordinate system, the apparatus comprising a processor:

said processor being configured to calculate a distance between the two object poses, the distance being calculated using the distance function:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

where X is the object pose of one object and Y is the object pose of the other object, $$d_s(X, Y) = \left|\log\!\left(\frac{s(X)}{s(Y)}\right)\right|,$$

$$d_r(X, Y) = \|R(X) - R(Y)\|_F,$$

$$d_t(X, Y) = \frac{\|t(X) - t(Y)\|}{s(Y)},$$

s(X) and s(Y) are scalar functions representing the scale of the object poses X and Y respectively, R(X) and R(Y) are matrices expressing the rotation of object poses X and Y respectively, t(X) and t(Y) are vectors expressing the translation of object poses X and Y respectively, and $\sigma_s$, $\sigma_r$ and $\sigma_t$ are weighting factors for $d_s$, $d_r$ and $d_t$ respectively.

Embodiments of the present invention can be implemented either in hardware or on software in a general purpose computer. Further embodiments of the present invention can be implemented in a combination of hardware and software. Embodiments of the present invention can also be implemented by a single processing apparatus or a distributed network of processing apparatus.

Since the embodiments of the present invention can be implemented by software, embodiments of the present invention encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

A system and method in accordance with a first embodiment will now be described.

FIG. 1(a) is a point cloud of a scene comprising four objects 1, 3, 5 and 7. The point cloud is obtained using the apparatus described with reference to FIG. 2. The point cloud comprises predicted points on a surface constructed from normals to the surface obtained by a 3-D imaging technique.

FIG. 1(b) shows the date of FIG. 1(a) after it has been modified by a method in accordance with present invention to allow recognition of the objects 1, 3, 5 and 7 which comprise the scene of FIG. 1(a).

Figure 2:
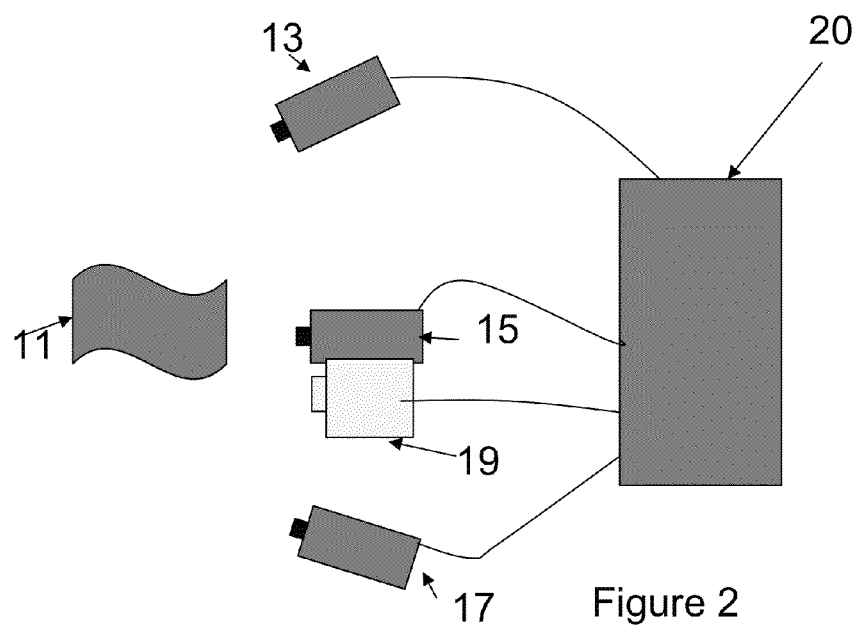
FIG. 2 is a schematic of an apparatus used for capturing a 3-D image.

FIG. 2 is a schematic of a system in accordance with an embodiment of the present invention used to capture an image of object 11 and recognise the pose of this object. The object 11 is illuminated by three different light sources 13, 15 and 17. In this embodiment, the three different light sources are capable of emitting radiation of three different colours. Here, the colours red, green and blue are selected as it is possible to obtain video cameras which can distinguish between these three colours. However, it is possible to use any three lights which can emit colours which can be distinguished between by a video camera. It is also possible to use lights which emit radiation in the non-optical radiation bands. The exact shade of colour or frequency of radiation chosen is dependent on the video camera. In one embodiment, the lights are projectors and filters are provided so that the scene is illuminated with radiation of a particular colour from each projector. In a further embodiment, LEDs are used to illuminate the object.

In an embodiment, the lights are adjusted to the frequency captured by the sensors within the camera so that each sensor can capture the colour in the range of 0 to 255. If colours outside this range are determined, then saturation can occur and this can cause errors in the generated 3-D image.

In this embodiment, the three lights 13, 15 and 17 are arranged laterally around the object 1 and are vertically positioned at levels between floor level to the height of the object 1. In one embodiment, the lights 13, 15, 17 are provided in a triangular arrangement. In one arrangement, the lights provided in a triangle will have a separation of between 1 to 3 m between adjacent lights, in a further arrangement between 1.5 to 2.5 m between adjacent lights. The lights are directed towards the object 1.

The angular separation between the three light sources 13, 15 and 17 is approximately 30 degrees in the plane of rotation about the object 11. Greater angular separation can make orientation dependent colour changes more apparent. However, if the light sources are too far apart, concave shapes in the object 1 are more difficult to distinguish since shadows cast by such shapes will extend over larger portions of the object making data analysis more difficult. In a preferred arrangement each part of the object 1 is illuminated by all three light sources 13, 15 and 17.

Camera 19 which is positioned vertically below second light source 15 is used to record the object as it moves while being illuminated by the three lights 3, 5 and 7. When the lights are arranged in a triangle, in one embodiment, the camera 19 may be placed in the plane of the triangle and within the triangle.

The camera 19 will have the ability to isolate between images of different colours. This may be achieved by a filter mechanism within the camera. Therefore, the camera 19 can capture an image of the object 11 using the illumination from all three light sources and will also be able to distinguish between the reflected radiation from each light source in turn. Therefore, it is possible to produce an image using the reflected radiation from the red light source, the green light source and the blue light source separately.

In one embodiment, the first video camera outputs raw image data. There is no compression for example due to MPEG or other data compression mechanism used. Compression of the image data can give rise to artefacts which manifest themselves in the reconstructed 3-D image.

The data captured by camera 19 is provided to analysis unit 20. Analysis unit 20 is also connected to the three light sources 13, 15 and 17.

Figure 3:
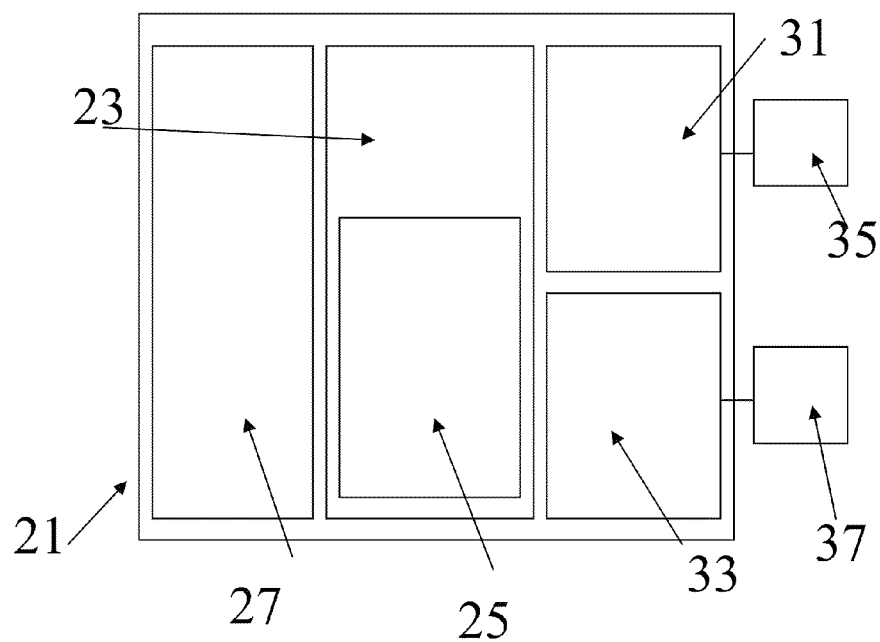
FIG. 3 is a schematic of a hardware system configured to implement a method in accordance with an embodiment of the present invention.

FIG. 3 shows a possible basic architecture of a system analysis unit 20. The analysis unit 20 comprises a processor 23 which executes a program 25. Analysis unit 13 further comprises storage 27. The storage 27 stores data which is used by program 25 to analyse the data received from the camera 19 (FIG. 2) and control illumination by the lights 13, 15 and 17. The analysis unit 20 further comprises an input module 11 and an output module 33. The input module 31 is connected to a camera input 35. Camera input 35 receives camera data from the camera 19. The camera input 35 may simply receive data directly from the camera or alternatively, camera input 35 may receive camera data from an external storage medium or a network.

Connected to the output module 33 is a display 37. The display 37 is used for displaying captured 3D images generated from the camera data received by the camera input 35. Instead of a display 27, the output module 33 may output to a file or over the internet etc.

In use, the analysis unit 20 receives camera data through camera input 33. The program 25 executed on processor 23 analyses the camera data using data stored in the storage 27 to produce 3D image data and recognise the objects and their poses. The data is output via the output module 35 to display 37.

The above has suggested a technique of capturing 3D object data using photometric stereo techniques. However, other methods are possible such as two-view stereo (which uses at least one light source and two cameras), time of flight sensors and active lighting depth sensors can be used.

Next, a method for detection of the objects and their poses in the captured image of the scene will be described.

Figure 4:
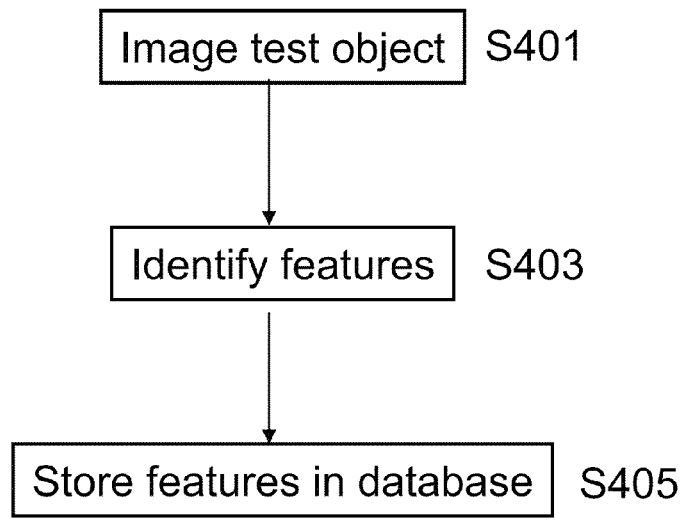
FIG. 4 is a flow diagram demonstrating how to capture features which can be used in a method accordance with an embodiment of the present invention.

Before object recognition can be performed, the system needs to be trained in order to store information concerning likely objects to be recognised. This will be described with reference to FIG. 4.

First, in step S401, an object or objects will be imaged using an apparatus similar to those described with reference to FIGS. 2 and 3.

In this embodiment, a coordinate system is assigned for each object. In one embodiment, the origin of the system is at the center of the object, the directions of the axes of the system correspond to the orientation of the object, and one unit length in this system is equal to the scale of the object. The system is specified by a single 4×4 affine transformation matrix, which transforms a point from the global coordinate system to the local coordinate system.

Figure 5:
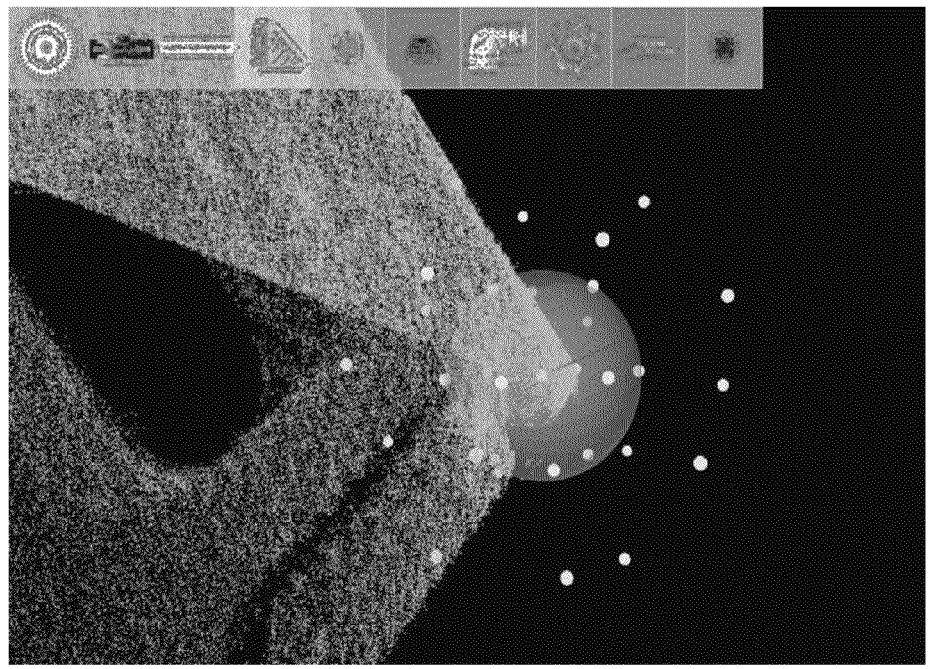
FIG. 5 is a photograph demonstrating a feature.

Features are extracted from the object. The features are spherical regions which are easily identified. An example of a feature is shown in FIG. 5.

How to identify features is known and will not be discussed further here. In this embodiment, a local coordinate system will be set for each feature. The origin of the system is at the feature's centre, the directions of the axes correspond to the feature's canonical orientation, and one unit length in the system is equal to the feature's radius. Again, the system is specified by a 4×4 transformation matrix, which transforms a point from the global coordinate system to the coordinate system of the feature. Within the feature's coordinate system, 31 points at prefixed locations close to the origin are sampled, creating a 31-dimensional descriptor vector. The tuple of (region center, region radius, orientation, descriptor) forms a feature and this is stored in step S405.

Thus, for each feature in the database both the transformation matrix of the feature's local coordinate system and that of the local coordinate system of the object associated to it is known. If the transform matrix for the feature is F1 and the transform matrix for the object is M1, then multiplying M1 with the inverse of F1, i.e. computing T=M1 (F1)^(−1), gives the transformation matrix T which transforms a point from the feature's local coordinate system to the associated object's local coordinate system.

Figure 6:
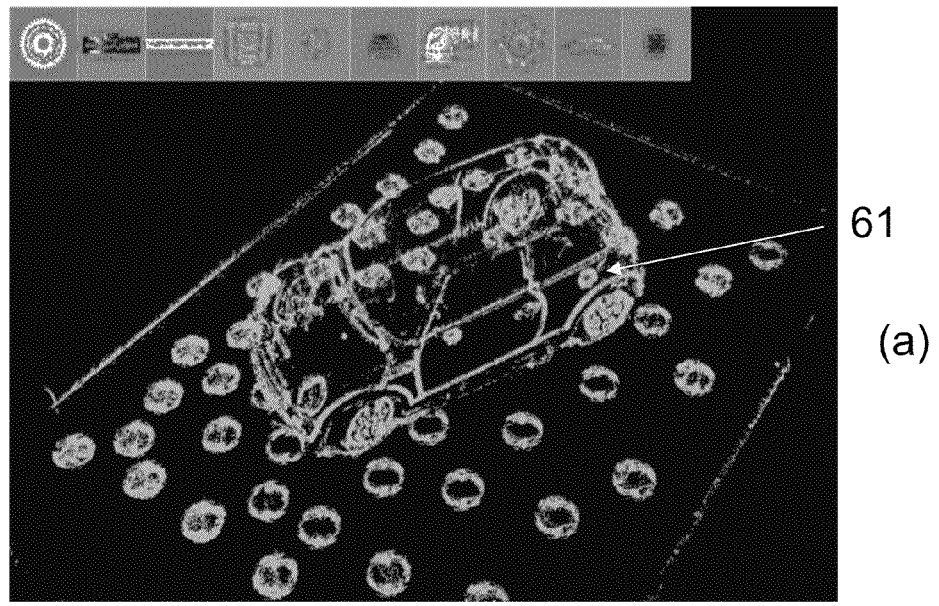
FIG. 6(a) is a point cloud generated from a captured 3-D image of an object and FIG. 6(b) shows the image of FIG. 6(a) with the extracted features.
Figure 6:
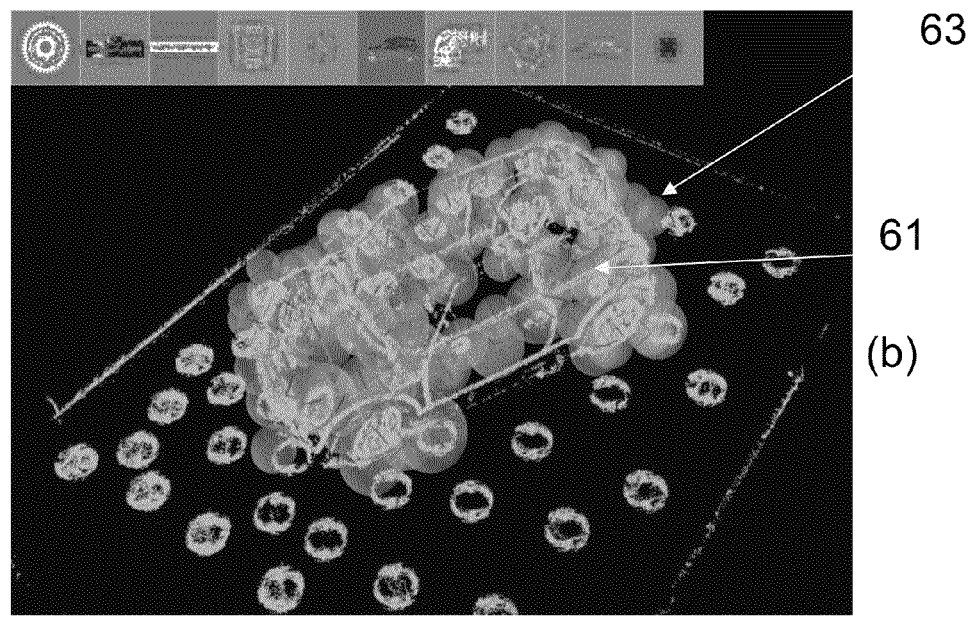

The matrix T is unchanged when the object is transformed by scaling, translation, and rotation. The above process is repeated for objects which are believed to be in the scene. For example, for the object 61 in FIG. 6(*b*), FIG. 6(*b*) shows the features 63 which have been assigned to the object 61.

Figure 7:
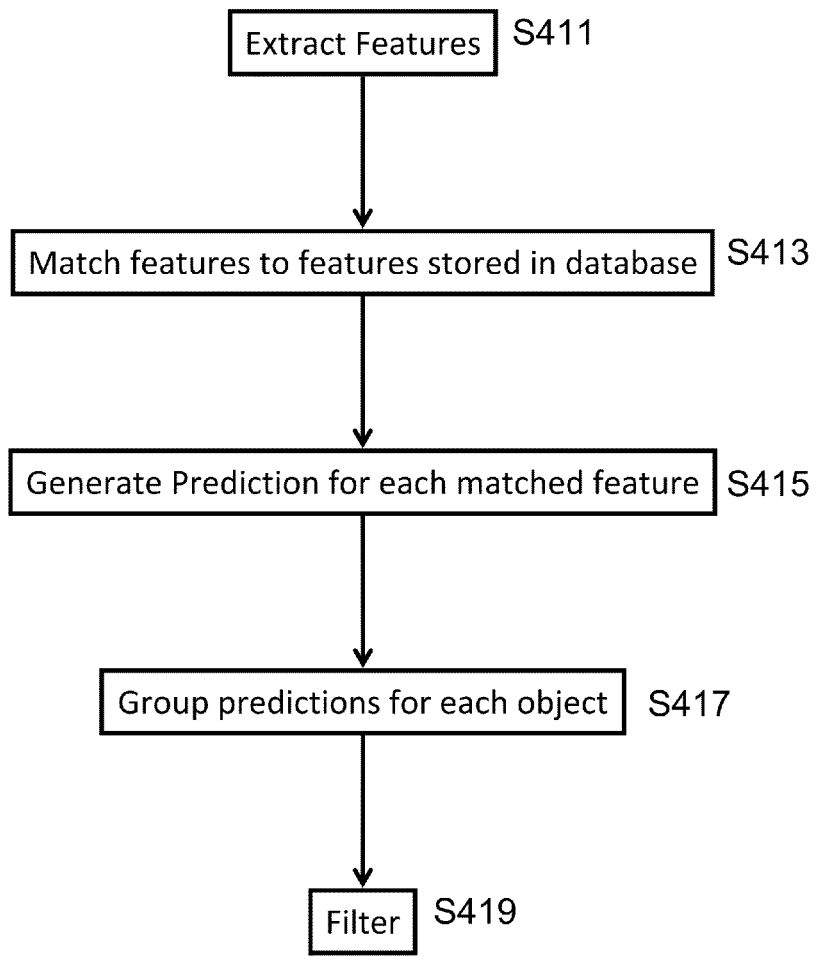
FIG. 7 is a schematic of a method in accordance with an embodiment of the present invention.

During operation, which will be described with reference to FIG. 7, an image will be captured as explained with reference to FIGS. 2 and 3. Features will then be extracted from this image in step S411. The features will be described as explained above with reference to FIG. 4. If there is a match between a descriptor of a feature in the database with a feature extracted from the image, then a prediction is generated.

In an embodiment, there is a match between two descriptors if their Euclidean distance is below a threshold. Once there is a match between a feature extracted from the image and a feature in the database, a prediction is generated in step S415. The prediction is a hypothesis of what object is being recognised and where it is located.

In an embodiment, when a feature on the scene is matched, only the transformation matrix of the feature's local coordinate system is known. When two features are matched, it is assumed that the transformation matrix that transforms a point from the local coordinate system of the feature from the test scene to the local coordinate system of the predicted object is the same as T. Therefore, if the transformation matrix for the matched feature from the global coordinate system is F2, the transformation matrix representing the predicted object's local coordinate system is then given by multiplying T with F2, i.e. M2'=T F2. M2' then gives the scale, the centre point, and the orientation of the predicted object pose.

In summary, by matching two descriptors, two corresponding regions are deemed to have the same shape. As the object's identity, location, scale, and orientation in the feature from the database is known, the object can be transformed (by scaling, translating, and rotating) so that the feature from the database is moved, scaled and rotated to the same place with the feature from the scene. This is then used to predict that this object, after being transformed, is present in the scene.

The above method results in many predictions. In step S417, the predictions are grouped.

Each prediction comprises information about the object's ID and its pose. Considering its pose (X), each pose can be represented as the transformation matrix:

$$X = \begin{bmatrix} s(X)R(X) & t(X) \\ 0^T & 1 \end{bmatrix}$$

Where s(X): real number relating to the size of the object, R(X): square matrix indicating the directions along which the object is oriented and t(X): vector indicating the location of the object center.

To group the poses, a kernel density estimation method (KDE) is used. In this method, a large number of poses $X_1, X_2, \ldots, X_n$ for an object are considered.

Each pose $X_i$ is now considered as a point in a high-dimensional (non-Euclidean) space, and it has a weight $\lambda_i$.

In some cases, all poses are treated equally and $\lambda_i=1$ for all poses. In a further embodiment, the poses are weighted.

In one method, weighting is performed by taking into account the number of instances of an object and features in an object in the database.

For example, if there are N objects in the database and each object can have a plurality of instances where each instance is a point cloud representing the same object scanned at a different pose. In such an scenario there can be $N_k$ instances of each object and each instance k of an object K has $N_{k,1}$ features. In this scenario the initial weight for each pose, which is the result of matching the feature with a feature on the scene, is set to:

$$\lambda_i = \frac{1}{N_k * N_{k,l}}$$

In the KDE method, it is assumed that all poses are sampled from an unknown probability density function f(X). The problem of grouping poses is reformulated as finding all points $X_1', X_2', \ldots, X_m'$ at which $f(X_1'), f(X_2'), \ldots, f(X_m')$ are locally maximized. Then, each pair $(X_j',f(X_j'))$ specifies a representative pose $(X_j')$ and its weight $(f(X_j'))$.

In this embodiment, solving this problem is performed in two steps:
(1) Estimating $f(X)$ from $(X_1, \lambda_1), (X_2, \lambda_2), (X_n, \lambda_n)$;
(2) Finding local maxima $X_1', X_2', \ldots, X_m'$ from $f(X)$.

KDE is a class of methods that assumes the unknown density function $f(X)$ can be approximated by a kernel density estimator $\hat{f}(X)$ which has the form:

$$\hat{f}(X) = \frac{1}{N}\sum_{i=1}^{N} \frac{1}{C(X_i)} K(d^2(X, X_i))$$

Where where $K(\ )$ is a kernel density function using distance function $d(\ )$, and $C(X_i)=\int K(d^2(X,X_i))dP(X)$ is the volume density function of $K(\ )$. The above assumes that $\lambda_i=1$ for all poses.

Figure 8:
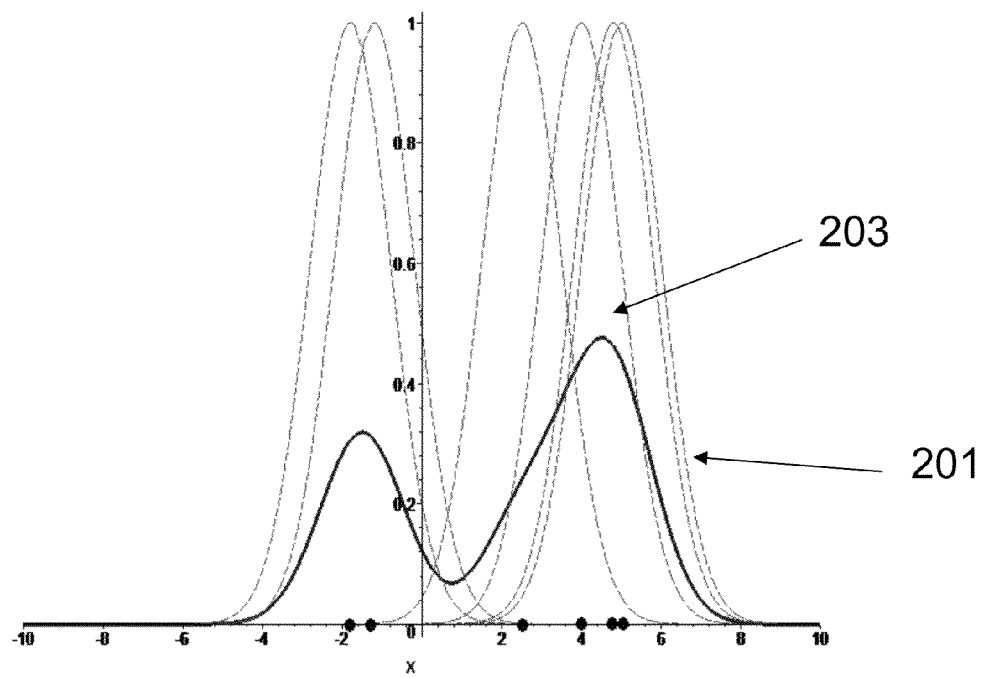
FIG. 8 is a plot of the density of the predicted poses modelled using a kernel density estimation method.

In this form, each point $X_i$ asserts a density function centered at $X_i$ based on the kernel function, which appears as a small "blob" as shown in traces 201 of FIG. 8 and $\hat{f}(X)$ is simply the average of all the density functions, which appear as the average of all the blobs shown as trace 203. In KDE, $\hat{f}(X)$ is used to estimate $f(X)$. As $\hat{f}(X)$ is defined directly from the input points, estimating $f(X)$ is not problematic. The local maxima of such a system can be found using methods such as Mean shift, medoid shift, and quick shift.

Figure 9:
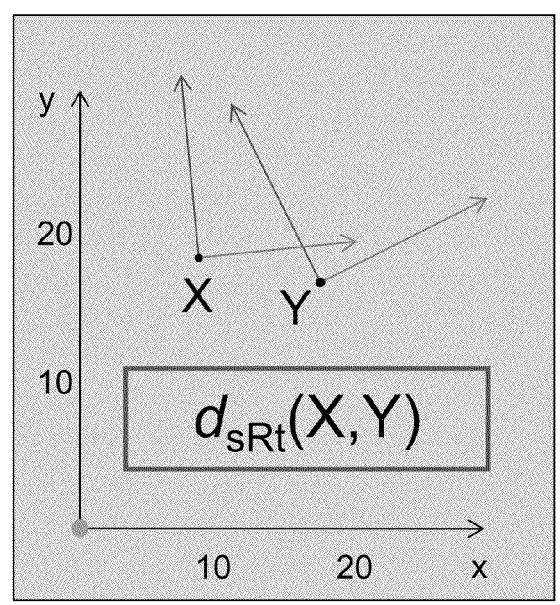
FIG. 9 is a schematic showing the variation between two poses.

The kernel density function $K(\ )$ will need to be defined (i.e. defining a small blob from a point). This can be done in any Euclidean space. However, it is more difficult to do so in a non-Euclidean space. The space of all poses is non-Euclidean. In accordance with an embodiment of the present invention a Gaussian SRT kernel is used which is based on the distance measure:

$$d_{sRt}(X, Y) = \sqrt{\frac{\log^2\left(\frac{s(X)}{s(Y)}\right)}{\sigma_s^2} + \frac{\|R(X) - R(Y)\|_F^2}{\sigma_r^2} + \frac{\|t(X) - t(Y)\|^2}{\sigma_t^2 s^2(Y)}}$$

where X and Y are object poses as shown schematically in FIG. 9, $s(X)$ and $s(Y)$ are scalar functions representing the scale of the object poses X and Y respectively, $R(X)$ and $R(Y)$ are matrices expressing the rotation of object poses X and Y respectively, $t(X)$ and $t(Y)$ are vectors expressing the translation of object poses X and Y respectively, and $\sigma_s$, $\sigma_r$ and $\sigma_t$ are weighting factors. The norm $\|\bullet\|_F$ represents the Frobenius norm of a matrix, and the norm $\|\bullet\|$ represents the Euclidean norm of a vector.

In an embodiment, $\sigma_s$, $\sigma_r$, $\sigma_t$ are found by maximizing the system's registration score on an independent test set. In this procedure, a test set of 200 point clouds with known object poses is created. The system is run on these point clouds with different combinations of $(\sigma_s, \sigma_r, \sigma_t)$. Then, a count is made of the number of times the system registers correctly for each combination. A registration is correct if:

The output scale is less than 5% the ground truth scale.
The distance between the output position and the ground truth position is within 10% the ground truth scale.
The angle between the output orientation and the ground truth orientation is less than 15 degrees.

A combination of $(\sigma_s, \sigma_r, \sigma_t)$ that maximizes the number of correct registrations is selected.

In an embodiment, typical ranges are:
$\sigma_s = 0.04 \ldots 0.12$
$\sigma_r = 0.06 \ldots 0.20$
$\sigma_t = 0.06 \ldots 0.20$ A ratio where: $\sigma_s:\sigma_r:\sigma_t=7:12:12$, e.g. $(\sigma_s, \sigma_r, \sigma_t)=(0.07, 0.12, 0.12)$ has been found to work well.

To find the local maxima, the mean-shift technique will now be described. The Mean shift method starts from an initial pose. Let this pose be Y. Given that the kernel $K(\ )$ is defined, in this case it is the Gaussian kernel using the above described distance measure, the method then iteratively "moves" Y until Y is stationary:

If there is a Gaussian kernel using the above described distance measure then centered at Y, $g_{Y(X)}$, (i.e. a small blob of the same shape with all the blobs defined in $\hat{f}(X)$) For every pose $X_i$, set a new weight $w_i = \lambda_i * g_{Y(X)}$. Thus, poses near Y have large weights and poses far away from Y have small weights.

Then, a new mean Y' may be computed from $(X_1, w_1), (X_2, w_2), (X_n, w_n)$ and Y is set to Y'. In an embodiment, the means is calculated using a mean based on the above distance measure. This mean is referred to as the sRt mean:

$$s(\mu_{sRt}(\chi)) = \exp\left(\frac{\sum_i w_i \log s(X_i)}{\sum_i w_i}\right),$$

$$R(\mu_{sRt}(\chi)) = sop\left(\frac{\sum_i w_i R(X_i)}{\sum_i w_i}\right),$$

$$t(\mu_{sRt}(\chi)) = \sum_i \frac{w_i t(X_i)}{s^2(X_i)} / \sum_i \frac{w_i}{s^2(X_i)}$$

Where $=\{(X_1,w_1),(X_2,w_2), \ldots (X_N,w_N)\}$ is a set of poses, $X_i$ is the ith pose, $w_i$ is a weight associated with the ith pose, said weight being an indication of the accuracy of the pose, where $sop(X)=\arg\min_{Y\in SO(n,R)} \|Y-X\|_F$ is the standard orthogonal projection of matrix X onto SO(n,R). Here, SO(n,R) is the set of all n-by-n standard orthogonal real matrices (i.e. any n-by-n real matrix Y such that $Y^T Y$ is an identity matrix and the determinant of Y is 1). The function $sop(X)$ returns a standard orthogonal matrix Y such that the Frobenius norm of Y-X is minimized. The function $sop(X)$ is known. It can be efficiently implemented by known methods.

It is mathematically proven that when Y is stationary (i.e. Y' is the same as Y), Y corresponds to a local maximum of $\hat{f}(X)$. Mean shift is run many times with different initial points to find as many local maxima as possible. In the step of computing a new SRT mean, all poses are used with different weights to compute a single mean. However, in practice, when $w_i$ is too small, regardless of whether or not $(X_i, w_i)$ is included in computing a new sRt mean, the component would have almost no effect on the resultant mean. Therefore, to save computations, an sRt mean is only computed from poses $X_i$ in which wi are greater than a threshold. In one embodiment, a threshold of 1E-11 is used.

The above is repeated for all objects.

Next a filtering process is performed in step S419 where the representative pose with the largest weight is selected. All poses which represent objects which overlay this pose are then removed. Next, the pose with the second largest weight is considered and all poses which overly this pose are also removed. The step is repeated until the weight of the pose under construction is smaller than a threshold or if there are no more poses.

This results in an identification of all objects and their poses in the scene.

Figure 10:
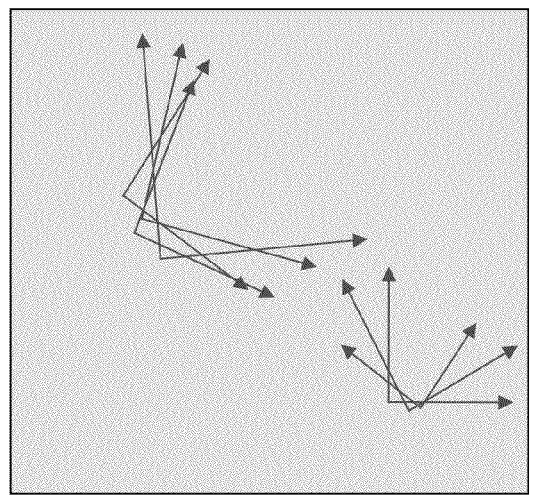
FIGS. 10(a) to (c) are three figures showing the stages of the input poses, density estimation and filtering in accordance with a method of the present invention.
Figure 10:
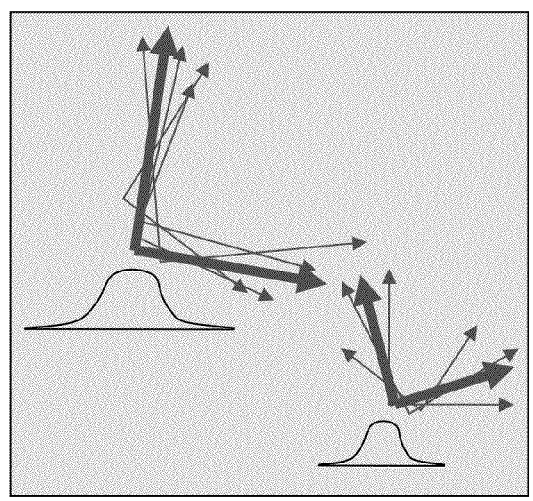
Figure 10:
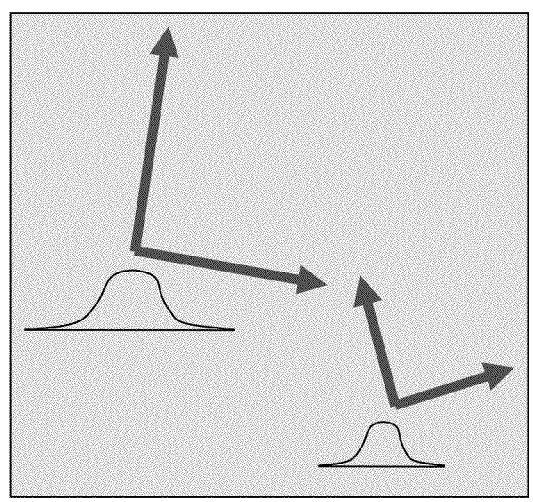

FIGS. 10(a) to (c) schematically show the process explained with reference to FIG. 7. FIG. 10(a) corresponds to step S415 when a prediction is generated for each matched feature.

FIG. 10(b) shows the density estimation is performed for the poses using the kernel density estimation method. This forms part of the grouping step of S417. The poses in each cluster then grouped to form a representative pose for each cluster and as shown in FIG. 10(c).

In the above embodiment, a vote-based 3D shape recognition and registration is provided. The votes being the 3D poses predicted for each object. The above embodiment, applies mean shift to a 3D application using translation, rotation and scale simultaneously.

The above uses mean shift on 3D pose votes in the space of direct similarity transforms. A distance measure between poses in this space is introduced, the SRT distance. It is left-invariant, unlike the Euclidean distance, and has a unique, closed-form mean, in contrast to Riemannian distance, and is thus computationally efficient.

In the above embodiment, an empirical distribution of poses through the collation of a set of possible poses, or votes is established. The votes are computed by matching local features from a test object to those in a library with known pose.

The second step is then to find one or more "best" poses in the distribution. In the above embodiment, this is achieved via a Mean shift process which iteratively finds local maxima of probability.

The system of the above embodiment can cope when the objects of interest are not fixed and of known orientation. In the above embodiment, objects are recognized and registered in the direct similarity group: the group of isotropic similarity transformations parameterized by translation, rotation and scale. Scale is necessary when the input data's scale is unknown, or when there is high intra-class scale variation. Rotation is necessary for full registration, leading to more accurate recognition. The resulting 7D pose space is too large to efficiently analyse with current computing power using known techniques.

The above embodiment uses a mean shift technique. In such a technique, scale and rotation may introduce problems using known distance measures such as Euclidean and Riemannian distances. The Euclidean distance is scale variant, and rotation creates a non-linear manifold, the projection onto which causes a bias in scale. The mean of Riemannian distances has no closed-form solution, and is slow to compute.

The above distance measure provides scale, rotation and translation-invariance concomitantly. In an embodiment, the weighted mean of this distance has the following properties:
1. Unique:
2. Closed-form—this aids efficient computation
3. Scale-compatible: If all rotations and translations are equal, the mean should behave as an average of the scales. Mathematically, if $\forall X_i \epsilon \chi : R(X_i) = R'$, $t(X_i) = t'$ for some R' and t', then μ is scale-compatible if $R(\mu(\chi)) = R'$, $t(\mu(\chi)) = t'$, and $s(\mu(\chi))$ to be an average of $s(X_i)$'s.
4. Rotation-compatible: If $\forall X_i \epsilon \chi : s(X_i) = s'$, $t(X_i) = t'$ then $s(\mu(\chi)) = s'$, $t(\mu(\chi)) = t'$ and, $R(\mu(\chi))$ is an average of $R(X_i)$'s.
5. Translation-compatible: If $\forall X_i \epsilon \chi : s(X_i) = s'$, $t(X_i) = t'$ then $s(\mu(\chi)) = s'$, $R(\mu(\chi)) = R'$ and, $t(\mu(\chi))$ is an average of $t(X_i)$'s.
6. Left-invariant: A left-invariant distance is one that is unchanged by post-transformation, i.e.: $d(ZX;ZY) = d(X;Y)$ $\forall X;Y;Z$. This property: (a) leads to a left-covariant mean: $\mu(ZX) = Z\mu(X)$, i.e.: if all poses $X_i$ are transformed by Z, the mean is also transformed by Z, and (b) it ensures that the weights wi computed in mean shift are invariant to any post-transformation Z, leading to left-covariant mean shift.

A symmetric distance, s.t: $d(X;Y) = d(Y;X)$ $\forall X;Y$ intuitively seems desirable, but its absence does not prevent a distance from being used in mean shift and furthermore, given the properties listed, it is not necessary. Right-invariance might also be considered a desirable property, but in the context of 3D recognition this occurrence does not relate to any meaningful behaviour.

The sRt distance can be divided into its components:

$$d_s(X, Y) = \left|\log\left(\frac{s(X)}{s(Y)}\right)\right|,$$

$$d_r(X, Y) = \|R(X) - R(Y)\|_F,$$

$$d_t(X, Y) = \frac{\|t(X) - t(Y)\|}{s(Y)},$$

of the in which $d_s()$ $d_r()$ and $d_t()$ measure scale, rotation and translation distances respectively.

Given some bandwidth coefficients $\sigma_s$; $\sigma_r$; $\sigma_t > 0$, the sRt distance is defined as:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

By controlling $\sigma_s$; $\sigma_r$; $\sigma_t$ it is possible to create an sRt distance that is more sensitive to one type of transformations among scale, rotation, and translation than the others and thus very flexible.

Having defined $d_{sRt}()$, the mean $\mu_{sRt}$ induced by $d_{sRt}()$ is defined as:

$$\mu_{sRt}(\chi) = \underset{X \in S+(n)}{\operatorname{argmin}} \sum_i w_i d_{sRt}^2(X, X_i).$$

This leads to the means:

$$s(\mu_{sRt}(\chi)) = \exp\left(\frac{\sum_i w_i \log s(X_i)}{\sum_i w_i}\right),$$

$$R(\mu_{sRt}(\chi)) = sop\left(\frac{\sum_i w_i R(X_i)}{\sum_i w_i}\right),$$

$$t(\mu_{sRt}(\chi)) = \sum_i \frac{w_i t(X_i)}{s^2(X_i)} \bigg/ \sum_i \frac{w_i}{s^2(X_i)}$$

Where $sop(X) = \arg\min_{Y \in SO(n,R)} \|Y - X\|_F$ is the standard orthogonal projection of matrix X onto SO(n,R). Here, SO(n, R) is the set of all n-by-n standard orthogonal real matrices (i.e. any n-by-n real matrix Y such that $Y^T Y$ is an identity matrix and the determinant of Y is 1). The function sop(X) returns a standard orthogonal matrix Y such that the Frobenius norm of Y-X is minimized. The function sop(X) is known. It can be efficiently implemented by known methods, for example M. Moakher. Means and averaging in the group of rotations. SIAM J. Matrix Anal. Appl., 24:1-16, 2002.

In the above, when computing the rotation mean matrix, a weighted arithmetic average of all the rotation matrices $R(X_i)$ is computed. It is then replaced by a true rotation matrix closest to it via the function sop( ). Any standard orthogonal real matrix is a real matrix and vice versa. Sop( ) is used in this embodiment because the weighted average matrix is not necessarily a rotation matrix.

To demonstrate the above, an experiment was performed using experimental data consisting of 12 shape classes, for which there was both a physical object and matching CAD model.

Figure 11:
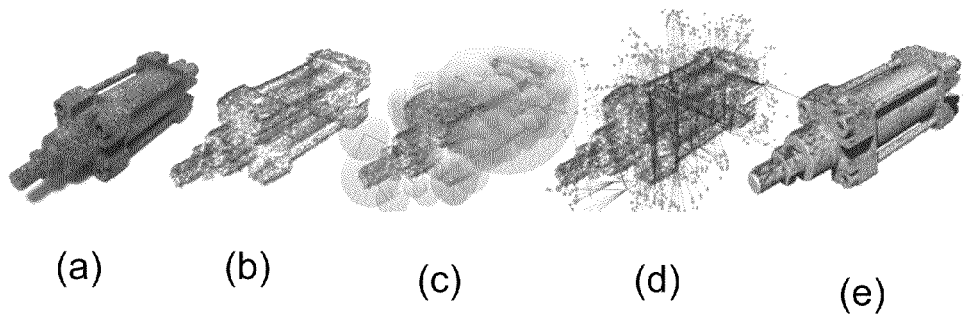
FIG. 11(a) is an object to be imaged and the image processed using a method in accordance with an embodiment of the present invention.
FIG. 11(b) is a point cloud of the object of FIG. 11(a)
FIG. 11(c) is the point cloud of FIG. 11(b) with detected features superimposed.
FIG. 11(d) is a depiction of the predicted poses generated after comparing the detected features with those of the database.
FIG. 11(e) is the registered CAD model returned by the system for the objection in FIG. 11(a)

The geometry of each object as shown in FIG. 11(*a*) was captured in the form of point clouds as shown in FIG. 11(*b*) 20 times from a variety of angles. Along with the class label, every shape instance has an associated ground truth pose, computed by first approximately registering the relevant CAD model to the point cloud manually, then using the Iterative Closest Point algorithm to refine the registration.

Given a test point cloud and set of training point clouds (with known class and pose), the computation of input pose votes X is a two stage process. In the first stage, local shape features, consisting of a descriptor and a scale, translation and rotation relative to the object, are computed on all the point clouds as shown in FIG. 11(*c*). This is done by first converting a point cloud to a $128^3$ voxel volume using a Gaussian on the distance of each voxel centre to the nearest point. Then interest points are localized in the volume across 3D location and scale using the Difference of Gaussians operator, and a canonical orientation for each interest point computed, to generate a local feature pose. Finally a basic, 31-dimensional descriptor is computed by simply sampling the volume (at the correct scale) at 31 regularly distributed locations around the interest point.

In the second stage each test feature is matched to the 20 nearest training features, in terms of Euclidean distance between descriptors. Each of these matches generates a vote as shown in FIG. 11(*d*) $X_i = AB^{-1}C$ for the test object's pose, A, B and C being the test feature, training feature and training object's ground truth pose respectively. In addition each vote has a weight, $\lambda_i$, computed as $(N_C N_I)^{-1}$, $N_C$ being the number of training instances in the class and $N_I$ the number of features found in the feature's particular instance.

Mean shift finds a local mode, and its weight, in the output pose distribution for a given object class. Since there may be many such modes, the mean shift starts from 100 random input poses for each class. Each mode, duplicates excepted, is then added to a list of candidate poses across all classes. In $S^+(3)$ it is possible to use the quaternion representation of rotation, q(X). Using this formulation, the the rotation component of dsRt( ) may be defined as:

$$d_r(X, Y) = 1 - |q(X)^T q(Y)|,$$

where | . . . | is needed to account for the fact that q(X) and −q(X) represent the same rotation. This formulation confers a small computational advantage over other, noncomponent-wise distances in this space.

In this example, a Hough voting scheme was implemented to compare with the mean shift inference approaches. This computes sums of weights of the pose votes which fall into each bin of a 4D histogram over translation and scale, effectively marginalizing over rotation. The bin widths are set to be 0.16 times the width (or scale) of the average shape in each of the 4 dimensions. The highest bin sum for each class defines a pose mode.

Cross validation was used on the training data for evaluation. A training set was created from 19 of the 20 shape instances in each class, and the remaining instance in each class becomes a test shape. Each test shape undergoes 5 random transformations (over translation, rotation and scale in the range 0.5-2), and this process is repeated with each training shape being the test shape, creating 100 test instances per class.

Figure 12:
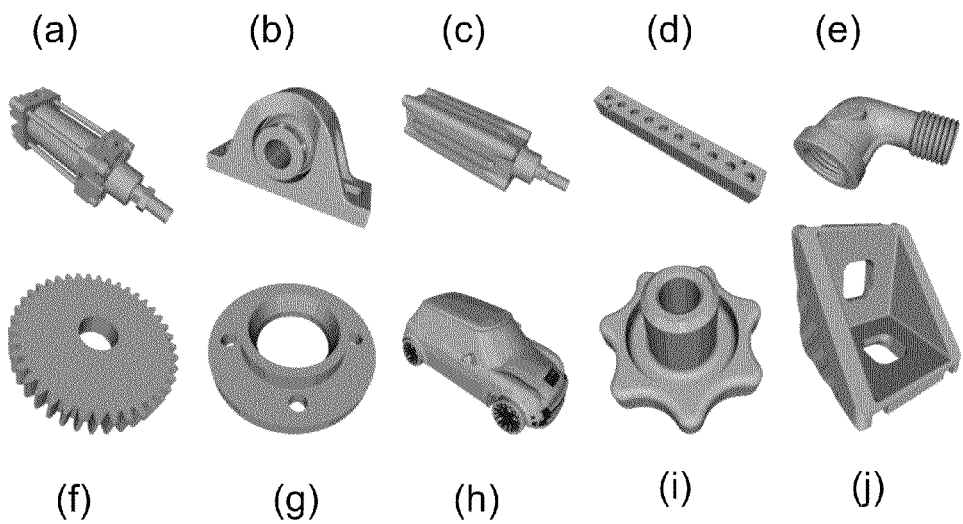
FIGS. 12(a) to 12(j) industrial parts which are recognised and registered as an example using a method in accordance with an embodiment present invention.

12 classes were used in the evaluation as shown in FIG. 12, these are: a bearing, a block, a bracket, a car, a cog, a flange, a knob, a pipe and two pistons. This results in 1000 tests in all. The remaining 2 classes are used to learn the optimal kernel bandwidth, σ, for the inference method.

The inference method was evaluated on two criteria: Recognition rate and registration rate.

Recognition rate—As described above, a list of modes across pose and class with an associated weight are generated. The output class is that of the mode of highest weight. A confusion matrix logs the output class versus ground truth class across all tests. The recognition rate is given by the trace of this matrix, i.e.: the number of correct classifications.

Registration rate—The output pose for a given test is given by that of the weightiest mode whose class matches the ground truth class. A pose X is considered correct if it meets all the following criteria on scale, rotation and translation respectively:

$$\left|\log\left(\frac{s(X)}{s(Y)}\right)\right| < 0.05,$$

$$\operatorname{acos}\left(\frac{\operatorname{trace}(R(X)^{-1}R(Y)) - 1}{2}\right) < \pi/12,$$

$$\frac{\|t(X) - t(Y)\|}{\sqrt{s(X)s(Y)}} < 0.1,$$

with Y being the ground truth pose. In the case of an object having symmetries there are multiple Y's, and distance to the closest is used.

To determine $\sigma_s$, $\sigma_r$ and $\sigma_t$ used in the mean shift algorithm, maximizing the registration rate from cross-validation on two training classes (which are not used in the final evaluation) is maximized. The registration rate is maximized using local search: an initial bandwidth is chosen, then the registration rate computed for this value and the values 1:2 and 1=1:2 times this value. That value with the highest score is chosen, and the process is repeated until convergence. With 3 parameters to learn, the local search is computed over a 3D grid.

Table 1 summarizes the quantitative results for the mean shift method using sRt:

TABLE 1

|  | sRt |
| --- | --- |
| Recognition | 61.5% |
| Registration | 68.1% |
| Reg. (t, s) | 79.7% |
| Proc. time | 1.3 s |
| Mean Scale | 0.998 |

Table 1 shows that sRt mean shift shows good results for both recognition and registration. The third row gives registration rate taking into account scale and translation only. Also given (row 5) is the mean of output scales (each as a ratio of the output scale over the ground truth scale) of the registration result.

The per-class registration rates of the mean shift methods are given in table 2.

TABLE 2

| | Bearing | Block | Bracket | Car | Cog | Flange | Knob | Pipe | Piston 1 | Piston 2 |
|---|---|---|---|---|---|---|---|---|---|---|
| sRt | 81 | 16 | 89 | 74 | 100 | 38 | 89 | 86 | 45 | 63 |

Figures 13, 14:
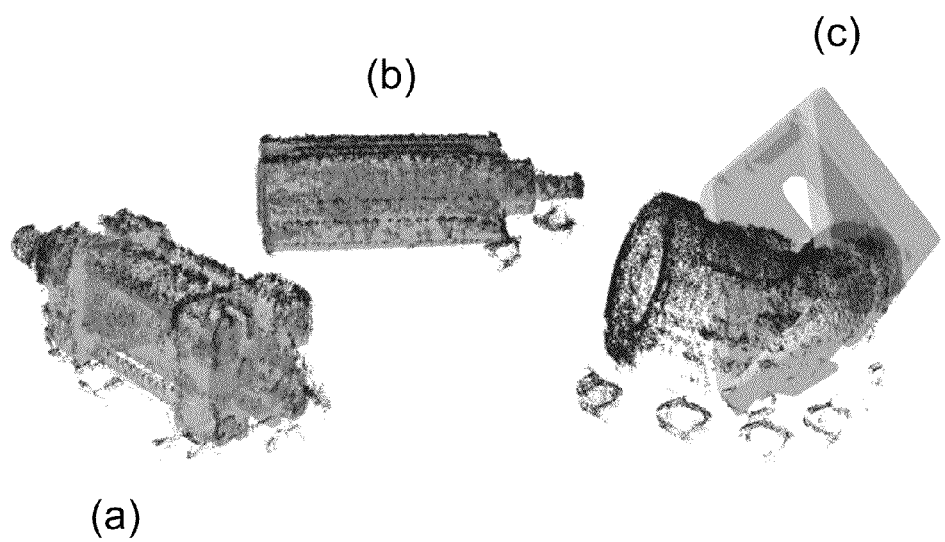
FIG. 13 is a confusion matrix for the objects of FIG. 12.

The confusion matrices for the sRt inference method is shown in FIG. 13.

Finally, FIG. 14 demonstrates that sRt mean shift can be readily applied to real scenes containing multiple objects.

In a further embodiment, the system can additionally filter the list of output poses using physical constraints such as the position of the ground plane and collision detection, which can reduce the number of false positive results.

The above demonstrates the use of the sRt distance for use in mean shift on poses in the space of direct similarity transforms, S+(n). The distance has been shown to be left-invariant, and have a unique, closed-form mean with the desirable properties of scale, rotation and translation compatibilities.

This distance can be used for registration and recognition tasks on a challenging and realistic 3D dataset which combines real-world objects, with and without rotational symmetries, together with a vision-based geometry capture system and basic features.

In further embodiments the sRt mean shift with either Hough voting (omitting rotation), or medoid shift for initialization, to reduce computation time. In addition, the lack of a correlation between registration and recognition scores suggests that the weights of the input votes can be improved.

Figure 15:
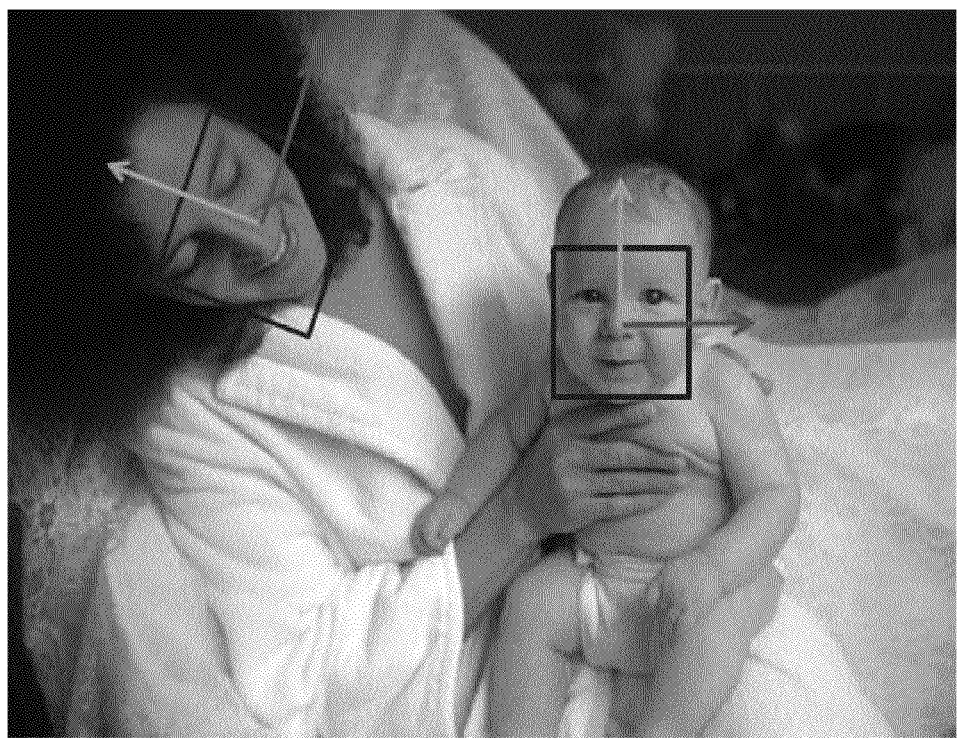
FIG. 15 is a photograph indicating how methods in accordance with embodiments of the present invention can be used to recognise the position of faces in a picture.

In a further embodiment, the SRT distance is applied to object detection in images: These methods consider the problem of detecting objects of a certain class, e.g. class of all human faces, in an image. In these methods, the location of an object is specified by a square window as shown in FIG. 15, which represents the bounding box that contains the object in the image. The square window can be rotated, to represent the in-plane orientation of the object.

In such a method, a large number of windows at different scales, positions, and orientations are scanned across the image, each of which is classified as either positive or negative, where positive means that the window contains an object of interest and negative means otherwise. Then, positive windows which overlap each other are grouped. For each group, an "average" window is computed.

In a method in accordance with an embodiment of the present invention, the sRt mean is used to compute an "average" window from a set of windows. The list of average windows are then returned as a list of detected objects and their locations.

In a further embodiment, a representative window is selected as a medoid window for each group. A medoid window is itself a window in the group, whose average distances to other windows is minimal. In this embodiment, the distances between the windows is calculated using the sRt distance.

In a further embodiment, a method of tracking of articulated objects from parts is provided. To track an articulated object on image sequences, this method relies on other methods to detect or track rigid parts of the object which are easier for tracking. For each part, a number of candidate poses of the object is generated. The vote-based pose estimation framework can be used to combine the results and form stronger ones. The pose with the largest weight is then returned as the current pose.

Methods in accordance with embodiments of the present invention may also be applied to motion segmentation. In a video sequence, there can be multiple motions in action at the same time. For example, different objects or object parts move towards different directions. The goal is to segment these motions from the video sequence. Motion segmentation can be served as an initial step for multiple object tracking. Motion segmentation methods often establish correspondences between points, pairs of points, or sets of points from two consecutive frames. These correspondences are represented as 2D transformations.

The 2D transformations are then clustered into groups, each of which forms a motion. If the 2D transformations are assumed to contain just translation, scaling, and rotation then the vote-based pose estimation framework for 2D can be used to segment the 2D transformations. In this embodiment, a 2D image or a 3D image is processed using methods in accordance with embodiments of the present invention.

Methods in accordance with embodiments of the present invention may also be used for camera pose estimation. In camera pose estimation, one is interested in estimating the pose of a calibrated camera in the scene directly from the image sequence captured by the camera. Camera pose estimation is an important step in stereo 3D reconstruction methods.

Generally, camera pose estimation methods detects and tracks 2D corner points from the image sequence. Each small set of neighbouring corner points that is tracked between two consecutive frames can be used to generate a candidate camera pose. The weight of a candidate camera pose can be estimated by counting how many other corner points agree with the candidate pose. The pose estimation framework described with reference to FIGS. 4 to 10, can be used to find the most likely pose.

In a further embodiment, the camera pose is estimated from the weighted average pose using the sRt mean, or by finding the weighted medoid pose using the sRt distance.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A method of comparing two object poses, wherein each object pose is expressed in terms of position, orientation and scale with respect to a common coordinate system, the method comprising:

calculating a distance between the two object poses, the distance being calculated using the distance function:

$$d_{sRt}(X,Y) = \sqrt{\frac{d_s^2(X,Y)}{\sigma_s^2} + \frac{d_r^2(X,Y)}{\sigma_r^2} + \frac{d_t^2(X,Y)}{\sigma_t^2}}.$$

where X is the object pose of one object and Y is the object pose of the other object, $$d_s(X, Y) = \left|\log\left(\frac{s(X)}{s(Y)}\right)\right|,$$

$$d_r(X, Y) = \|R(X) - R(Y)\|_F,$$

$$d_t(X, Y) = \frac{\|t(X) - t(Y)\|}{s(Y)},$$

s(X) and s(Y) are scalar functions representing the scale of the object poses X and Y respectively, R(X) and R(Y) are matrices expressing the rotation of object poses X and Y respectively, t(X) and t(Y) are vectors expressing the translation of object poses X and Y respectively, and $\sigma_s$, $\sigma_r$ and $\sigma_t$ are weighting factors for $d_s$, $d_r$ and $d_t$ respectively.

2. A method according to claim 1, wherein the method further comprises calculating a kernel using said distance, said kernel having the form:

$K(d^2(X, Y))$.

3. A method according to claim 2, wherein the kernel is the Gaussian kernel with the form $$\exp\left(-\frac{\cdot}{2\sigma^2}\right)$$

where represents the variable of the Gaussian kernel, and $\sigma$ is the bandwidth of the kernel.

4. A method according to claim 1, wherein $0.04 \leq \sigma_s \leq 0.12$, $0.06 \leq \sigma_r \leq 0.20$ and $0.06 \leq \sigma_t \leq 0.20$.

5. A method of analysing image data, said method comprising:
analysing said image data to obtain a plurality of predictions of a pose of an object, said predictions comprising an indication of the predicted pose of the object, the predicted pose being expressed in terms of position, orientation and scale with respect to a common coordinate system,
grouping predictions together by comparing the predicted poses by calculating a distance between the two object poses, the distance being calculated using the distance function:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

where X and Y are object poses of the same object, $$d_s(X, Y) = \left|\log\left(\frac{s(X)}{s(Y)}\right)\right|,$$

$$d_r(X, Y) = \|R(X) - R(Y)\|_F,$$

$$d_t(X, Y) = \frac{\|R(X) - R(Y)\|}{s(Y)},$$

s(X) and s(Y) are scalar functions representing the scale of the object poses X and Y respectively, R(X) and R(Y) are matrices expressing the rotation of the object poses X and Y respectively, t(X) and t(Y) are vectors expressing the translation of the object poses X and Y respectively and $\sigma_s$, $\sigma_r$ and $\sigma_t$ are weighting factors for $d_s$, $d_r$ and $d_t$ respectively.

6. A method according to claim 5, wherein the image comprises at least one object and said prediction comprises an indication of said object and its pose.

7. A method according to claim 6, wherein said indication of said object is obtained by comparing at least a part of the data with data of objects in a database.

8. A method according to claim 7, wherein each object in said database comprises a plurality of features and comparing the image data with objects in the database comprises analysing said image data to look for matches with features of objects in said database.

9. A method according to claim 5, wherein the object is a camera used to capture the image.

10. A method according to claim 7, wherein grouping the object poses comprises using a kernel density estimation method which assumes that all poses are sampled from a distribution f(X), said kernel of said kernel density estimation method comprising the said distance function.

11. A method according to claim 10, wherein representative poses of the groups formed by said grouping are calculated by determining the local maxima of f(X).

12. A method according to claim 11, wherein the local maxima are derived using a technique determined from mean shift, quick shift or Medoid shift.

13. A method according to claim 11, wherein the maxima are derived using the mean shift technique, and wherein the mean at each stage of the iteration is calculated using:

$$s(\mu_{sRt}(\chi)) = \exp\left(\frac{\sum_i w_i \log s(X_i)}{\sum_i w_i}\right),$$

$$R(\mu_{sRt}(\chi)) = sop\left(\frac{\sum_i w_i R(X_i)}{\sum_i w_i}\right),$$

$$t(\mu_{sRt}(\chi)) = \sum_i \frac{w_i t(X_i)}{s^2(X_i)} \bigg/ \sum_i \frac{w_i}{s^2(X_i)}$$

where $X_i$ is the ith pose, $w_i$ is a weight associated with the ith pose, to calculate the mean object pose, where $\chi=\{(X_1,w_1), (X_2,w_2), \ldots (X_N,w_N)\}$ is a set of poses with $X_i$ is the ith pose, $w_i$ is a weight associated with the ith pose, $sop(X)=\arg\min_{Y \in SO(n,R)} \|Y-X\|_F$ is the standard orthogonal projection of matrix X onto SO(n,R) where SO(n,R) is the set of all n-by-n standard orthogonal real matrices and the function sop(X) returns a standard orthogonal matrix Y such that the Frobenius norm of Y-X is minimized.

14. A method according to claim 13, wherein the weights, $w_i$ are derived from $w_i = \lambda_i * K(d^2(Y, X_1))$, where K is a kernel function and d is a distance between the pose with the current estimated maxima Y using the mean shift technique and the pose $X_i$.

15. A method according to claim 12, wherein the pose estimations are first grouped using a Hough voting method.

16. A method according to claim 5, wherein each prediction has an initial weighting.

17. A method according to claim 5, wherein the image data is 3D image data.

18. A non-transitory carrier medium carrying computer readable instructions configured to cause a computer to the method of claim 1.

19. An apparatus for comparing two object poses, wherein each object pose is expressed in terms of position, orientation and scale with respect to a common coordinate system, the apparatus comprising a processor:

said processor being configured to calculate a distance between the two object poses, the distance being calculated using the distance function:

$$d_{sRt}(X, Y) = \sqrt{\frac{d_s^2(X, Y)}{\sigma_s^2} + \frac{d_r^2(X, Y)}{\sigma_r^2} + \frac{d_t^2(X, Y)}{\sigma_t^2}}.$$

where X is the object pose of one object and Y is the object pose of the other object, $$d_s(X, Y) = \left|\log\left(\frac{s(X)}{s(Y)}\right)\right|,$$

$$d_r(X, Y) = \|R(X) - R(Y)\|_F,$$

$$d_t(X, Y) = \frac{\|R(X) - R(Y)\|}{s(Y)},$$

s(X) and s(Y) are scalar functions representing the scale of the object poses X and Y respectively, R(X) and R(Y) are matrices expressing the rotation of object poses X and Y respectively, t(X) and t(Y) are vectors expressing the translation of object poses X and Y respectively, and $\sigma_s$, $\sigma_r$ and $\sigma_t$ are weighting factors for $d_s$, $d_r$ and $d_t$ respectively.

* * * * *